United States Patent [19]

Bertram et al.

[11] Patent Number: 5,134,580

[45] Date of Patent: Jul. 28, 1992

[54] COMPUTER WITH CAPABILITY TO AUTOMATICALLY INITIALIZE IN A FIRST OPERATING SYSTEM OF CHOICE AND REINITIALIZE IN A SECOND OPERATING SYSTEM WITHOUT COMPUTER SHUTDOWN

[75] Inventors: Randal L. Bertram; Dwayne T. Crump; Jeffrey V. Ford; Glenn E. Welman, all of Lexington, Ky.; John P. Wright, Boca Raton, Fla.

[73] Assignee: International Business Machines Corporation, Armonk, N.Y.

[21] Appl. No.: 497,373

[22] Filed: Mar. 22, 1990

[51] Int. Cl.$^5$ .................. G06F 9/445; G06F 9/44; G06F 13/00

[52] U.S. Cl. .................. 395/650; 364/928.4; 364/969; 364/975.1; 364/975.2; 364/976; 364/977; 364/DIG. 2

[58] Field of Search .................. 364/600, 900, 300

[56] References Cited

U.S. PATENT DOCUMENTS

| 4,403,303 | 9/1983 | Howes et al. | 364/900 |
|---|---|---|---|
| 4,530,052 | 7/1985 | King et al. | 364/200 |
| 4,626,986 | 12/1986 | Mori | 364/200 |
| 4,675,814 | 6/1987 | Murai et al. | 364/300 |
| 4,747,040 | 5/1988 | Blanset et al. | 364/200 |
| 4,764,864 | 8/1988 | Takane | 364/200 |
| 4,809,170 | 2/1989 | LeBlang et al. | 364/200 |
| 4,812,967 | 3/1989 | Hirosawa et al. | 364/200 |
| 4,835,677 | 5/1989 | Sato et al. | 364/200 |
| 4,837,674 | 6/1989 | Takane | 364/200 |
| 4,843,541 | 6/1989 | Bean et al. | 364/200 |
| 4,885,681 | 12/1989 | Umeno et al. | 364/200 |
| 4,945,468 | 7/1990 | Carson et al. | 364/200 |
| 4,947,478 | 8/1990 | Maeno | 364/200 |

*Primary Examiner*—Stuart N. Hecker
*Assistant Examiner*—George C. Pappas
*Attorney, Agent, or Firm*—John A. Brady; Charles E. Rohrer

[57] ABSTRACT

A computer system with read-only memory and permanent read/write memory provides the user with the capability of loading an alternate operating system at the conclusion of a session without turning the computer off and then on. A customization word with a system request (SR) bit is located in read/write memory and is set by routines located in ROM upon user request. A reinitialization is then forced which resets the SR bit and brings up the machine in the alternate operating system located in external memory on a diskette or fixed disk. A flexible initialization system is also disclosed providing customized initialization in a variety of operating systems and applications. The preferred customized initialization is maintained for future system start-ups due to the resetting of the SR bit.

9 Claims, 6 Drawing Sheets

COMPUTER WITH CAPABILITY TO AUTOMATICALLY INITIALIZE IN A FIRST OPERATING SYSTEM OF CHOICE AND REINITIALIZE IN A SECOND OPERATING SYSTEM WITHOUT COMPUTER SHUTDOWN

This invention relates to the initialization of computers and more specifically relates to a system which allows the computer user to initialize the system in an operating system and/or application of choice.

RELATED PATENT APPLICATIONS

U. S. patent application Ser. No. 07/497,384 describes the basic initialization procedure also set forth herein.

BACKGROUND OF THE INVENTION

Personal computer systems always include means for initializing the computer when the power is turned on. Ordinarily, the booting sequence includes various tests of computer components to determine whether everything connected in the system is in operating order. Ultimately, a screen is presented to the computer user to enable interaction through which commands can be received.

It is common for initialization routines to include bringing up an operating system such as, for example, the IBM Disk Operating System (DOS) so that upon turning on the computer the system initialization includes loading DOS and eventually providing a "DOS prompt" on the screen for interaction. Typically, the user will have selected the operating system to be used such as IBM DOS and will have placed a diskette containing the DOS into a diskette drive so that the boot-up procedure can include loading DOS. If desired, the user may have copied the operating system onto a fixed disk associated with the system so that the diskette need not be inserted every time the computer is turned on.

Once a computer has been initialized and an operating system such as IBM DOS is resident, application programs which run under the operating system can be used. For example, word processors which operate under the operating system can be utilized, spreadsheet programs can be utilized, and information applications such as stock quotations or educational services or User's Club can be run. Should, however the user desire to run an application under a different operating system, it is typically necessary to turn the computer off, insert a different operating system in the diskette drive, turn the computer back on and initialize the computer in the different operating system. Then the application can be inserted in the diskette drive and the application can finally be run.

In order to save time for the user, a personal computer has been developed with the IBM DOS operating system located in read-only-memory (ROM) so that initialization of the machine directly brings the machine up with that operating system ready to use, thus avoiding the need for the computer user to insert a diskette containing an operating system into the diskette drive and/or also avoiding the need for the computer to turn to the fixed disk to find an operating system. However, many users may desire to bring up the machine with a different operating system from that particular version of IBM DOS located in ROM. Therefore, a flexible initialization system has been invented to bypass the operating system located in ROM and thereby enable the user to bring the computer up in an operating system of choice. Additionally, the flexible initialization system enables the user to bring the computer up already in a particular application. Also, provision is made to allow the reading of special DOS start-up files which alter the start-up which would occur utilizing the entirety of the DOS located in ROM. In that manner, flexibility is provided the user so that initialization results in a customized starting point of the user's choice.

It is an object of this invention to provide a computing system which enables the computer user to automatically start the computer in an operating system located in ROM or in the operating system of choice, and then go to a different operating system without turning the computer off and back on.

It is a further object of this invention to enable the computer user to retain the chosen customized initialization for use on the next power-on sequence.

SUMMARY OF THE INVENTION

This invention relates to a computer system in which the user is enabled to automatically start the computer from an operating system stored in ROM or in another operating system of choice. The booting sequence has no dependence on data stored on any diskette or disk and the very first initialization will automatically load the operating system stored in ROM and take the user to a screen with a main menu, "the ROM shell", after booting has completed. However, the system also includes customizing bits which are stored in permanent read/write memory which can be, for example, battery backed-up complimentary metal oxide semiconductor random access memory (CMOS RAM) in order to allow the user to change the start up sequence. These bits are initially set to a default state, but can be changed by the user. In that manner, the user is enabled a great degree of freedom in initializing the computer to a selected operating system different from the operating system stored in ROM; to a selected application; or to a personalized version of the operating system stored in ROM. This flexible initialization system is altered by this invention to include apparatus for indicating to the system that the computer user desires to end the session and go to still another operating system. Upon recognition of that request, the computer system is reinitialized with the new operating system which will be located in external memory on a flexible diskette or on a fixed disk. Provision is made in the customization word for carrying out the request and for deleting the request thereafter so that the next future initialization is once again in the usual operating system of choice.

BRIEF DESCRIPTION OF THE DRAWING

This invention is set forth in detail below with reference to the accompanying drawing, a brief description of which follows.

DETAILED DESCRIPTION

Figure 1:
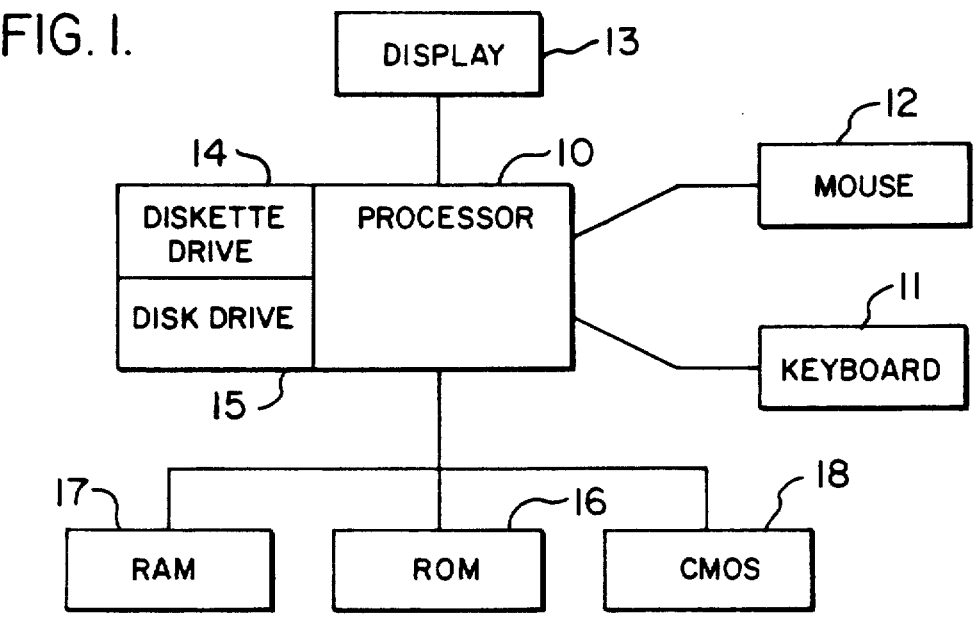
FIG. 1 shows major elements of the computer system.

FIG. 1 shows a typical configuration of a computing system utilizing the instant invention. The system processor component 10 includes means for accomplishing all required arithmetic computations and logic functions and includes means for receiving and sending data from all connected devices. Input to processor 10 can be received from keyboard 11 or mouse 12 which are alternative sources of manual input from the computer user. The display device 13 may be any standard display such as a CRT. The system will include system drive devices for holding external memory such as a diskette drive 14 and possibly a disk drive 15 as illustrated in FIG. 1. The system will include read-only-memory (ROM) 16, random access memory (RAM) 17 and CMOS 18. The latter memory is backed up by battery and can thereby retain data during periods when computer power is off.

Figure 2:
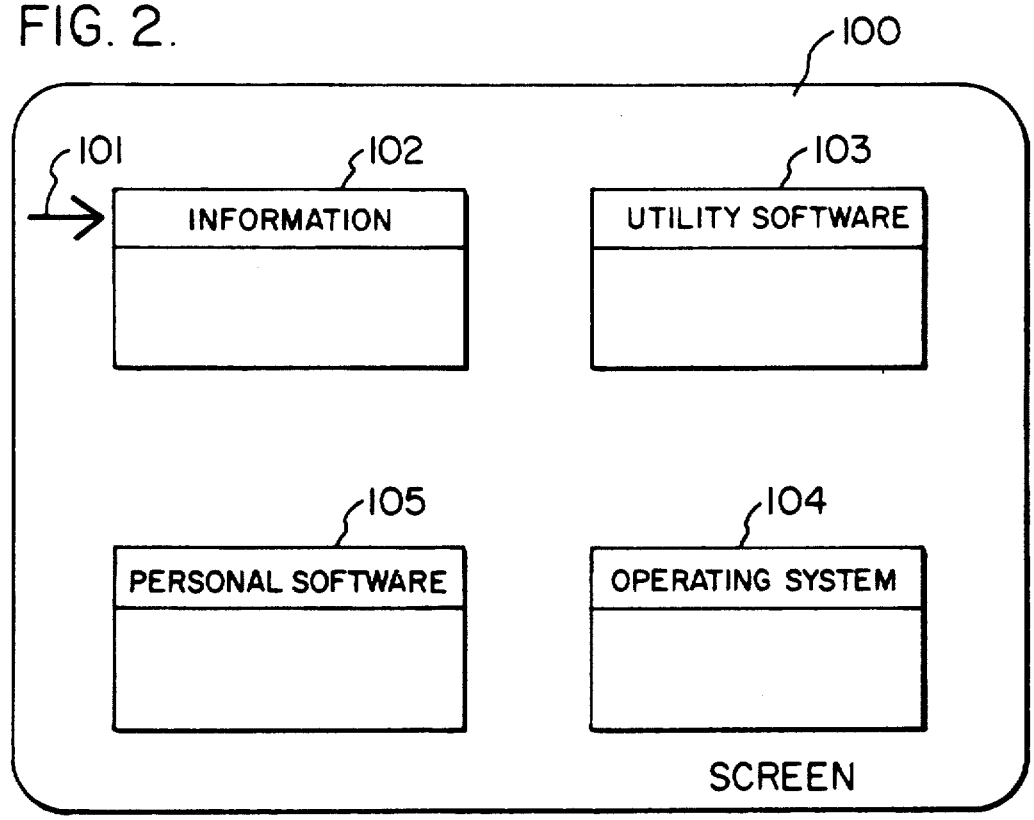
FIG. 2 is a depiction of the default display screen which appears upon initialization of the system of FIG. 1.

ROM 16 contains all of the programs needed for initializing the computing system. For example, ROM 16 contains the basic input/output system routines (BIOS), and it contains a version of IBM DOS so that upon completion of the initialization routines that operating system is resident in RAM and ready to go. However, instead of initializing to the DOS "prompt" as is usually the case, a special routine called the "System Menu" has been developed which produces a screen for enabling the computer user to choose functions from a convenient menu thereby alleviating the need to understand DOS commands and typing those commands at the DOS "prompt". That special screen is also stored in ROM and is called the "ROM Shell" screen. FIG. 2 shows the "ROM Shell" screen 100 and shows that the user is given four choices. Through use of this screen and through the keyboard 11 or the mouse 12 to manipulate the cursor 101, the user can select from the Information category 102, from the Utility Software category 103, from the Operating System category 104 or from the Personal Software category 105.

In selecting from the ROM Shell screen, the user may select the Information category by positioning the cursor 101 as shown in FIG. 2, and then pressing the "enter" key on the keyboard or mouse. Upon that selection, a subsequent screen will automatically appear providing the user the opportunity to select from further programs which are included under Information. Such programs might, for example, be an on-line shopping service such as PRODIGY or a computer Users Club. If the user were to select Utility Software, which might include a word processor or spreadsheet program, for example, the trademarked MICROSOFT WORKS program, a screen would appear which would provide a list of functions within MICROSOFT WORKS from which the user could select. If the user selects the Operating System category, and the resident operating system is IBM DOS, then a list of IBM DOS functions appears on the screen again for user selection. Similarly, if the Personal Software category is selected, then a list of those programs which the user has established in his own directory would appear on the screen for user selection. In that manner, the user can select the program or the function desired and can go directly to that function or program without the necessity of writing out commands on the screen. For example, should a user wish to make a back up copy of the fixed disk or of a diskette, the IBM DOS category should be selected whereupon a menu of the type of functions available in IBM DOS appears on the screen. The user would then move the cursor to select "back up copy" and by pressing the mouse key or the enter key on the keyboard, a back up copy would be made on a diskette inserted into drive 14. This illustrates the simplicity of the system; in previous machines the proper command for making a back up copy would have to be spelled out at the DOS prompt in order to perform the function.

As described above, the computing system shown in FIG. 1 contains a version of IBM DOS in ROM which is automatically loaded during the initialization process. That activity speeds the initialization of the system and eliminates the common steps in the prior art of inserting a diskette containing IBM DOS into the diskette drive and then initializing the system. While this new initialization procedure is useful and aids the ease through which the machine is used, at times the user may wish to load a different version of IBM DOS or a completely different operating system such as OS/2, AIX, UNIX or any other operating system suitable for the computing system. As a consequence, it is desirable that the initialization routine be flexible so that these alternate operating systems can be loaded if desired.

Many users prefer to operate their computer in particular applications a high percentage of the time. For these users, the prior art has required the loading of that application after previously initializing the machine and bringing it up in a certain operating system. Therefore, it is desirable that applications be included within the initialization so that, if desired, the user can bring the machine up already in the application of choice. For example, the user might always want to bring the machine up in MICROSOFT WORKS, or in LOTUS 1-2-3. It would also be desirable for the user to be able to return to an operating system from such program or from whatever other application program the user has selected for initialization so that other applications can be run. A description of the flexible initialization process will now be described.

Figure 3A:
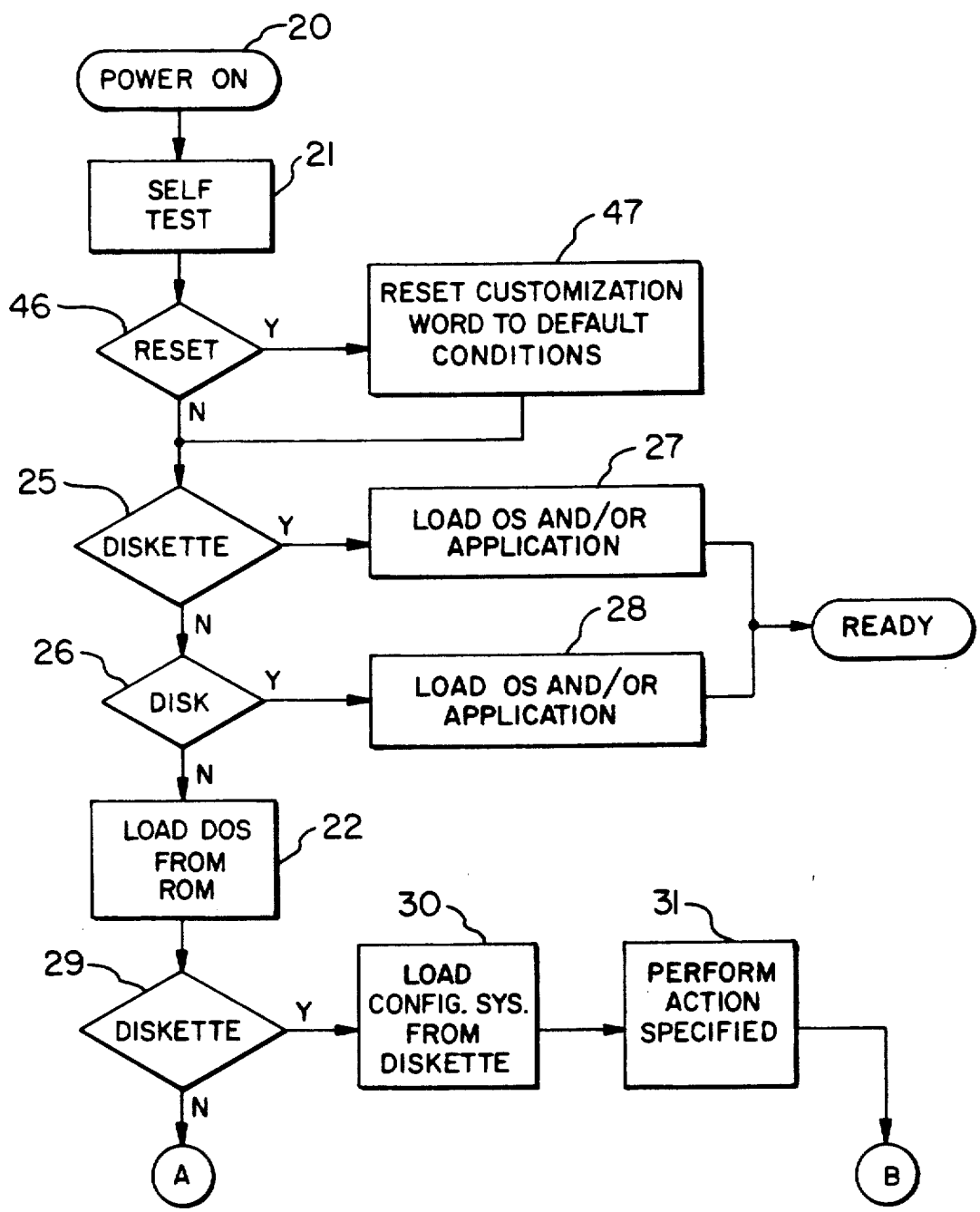
FIG. 3 comprised of FIGS. 3A and 3B, is a flowchart of the flexible initialization system.
Figure 3B:
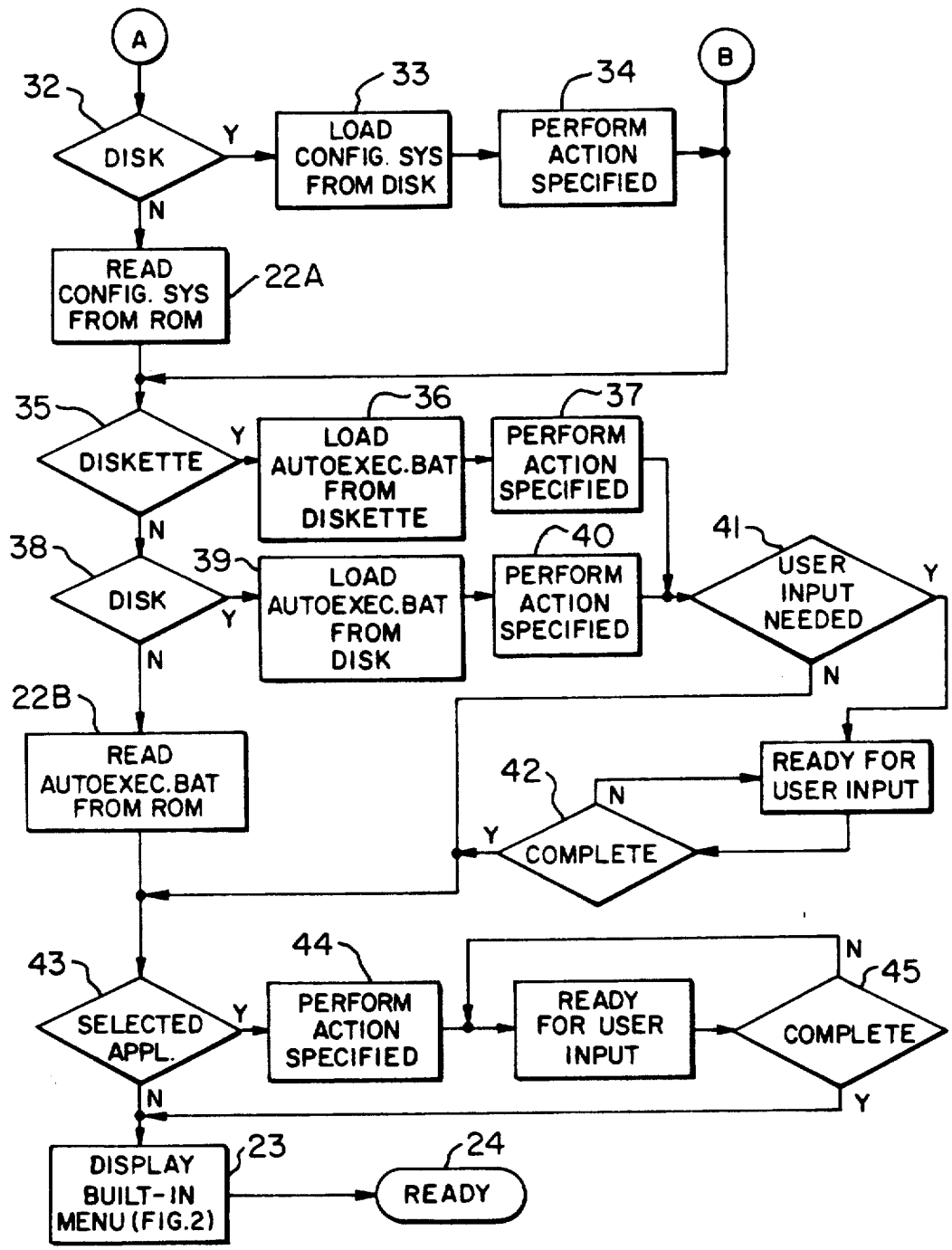

FIG. 3 shows the steps taken for default initialization in order to load IBM DOS and display the ROM Shell screen. When the machine is powered on at step 20, various self-test routines are run at step 21 in order to ascertain that all components of the computing system are ready. For default initialization, the procedure then falls through various intermediate actions shown in FIG. 3 to steps 22, 22A and 22B where the version of IBM DOS located in ROM is loaded, together with the CONFIG.SYS and AUTOEXEC.BAT files located in ROM. Thereafter, the ROM shell screen appears on display 13, step 23, and the computing system is ready for use as shown at step 24.

Provision is made, however, for a flexible initialization of the machine such that if the user wishes to load another operating system, the various intermediate actions shown in FIG. 3 intercept the default initialization process. For example, at step 25 or at step 26, flags are inspected, and if set, the diskette drive and the fixed disk drive are addressed in order to load an alternate operating system at step 27 or step 28. The user could have a diskette, for example, loaded in the diskette drive 14 so that an alternate operating system on the diskette could be loaded at step 27. If the user desires to load a game of some kind, and since many games include their own simplified operating systems, the computer can be initialized in that game through a branch taken at step 25 to load the game diskette at step 27.

In default initialization, booting the system occurs entirely from ROM 16, and various IBM DOS files in ROM are utilized including a CONFIG.SYS file and an AUTOEXEC.BAT file. The CONFIG.SYS file configures the computing system to work with certain peripheral devices, for example, printers and additional memory. The AUTOEXEC.BAT file loads preselected routines so that the operator need not load them individually on each initialization. More sophisticated users of the computing system may want to customize one or both of these files for their particular use. For example, a user might want to change the mouse driver routine and therefore might want to change the CONFIG.SYS file. The flexible initialization routine of the instant invention provides mechanisms for the sophisticated user to bring the system up with the particular mouse driver routine of choice. This is accomplished by placing the alternate CONFIG.SYS file on a diskette, setting a flag, inserting the diskette into the diskette drive 14 and bringing the system up with those files instead of the default files on ROM 16. This is shown in FIG. 3 at steps 29, 30 and 31 and for the use of the fixed disk to perform the operation, at steps 32, 33 and 34. Similarly, reading external memory for an alternate AUTOEXEC.BAT file is shown at steps 35, 36 and 37 for the diskette drive and at steps 38, 39 and 40 for the disk drive. Note that in using the AUTOEXEC.BAT file, the computer user can bring the system up in an application of his choice, for example, the trademarked LOTUS 1-2-3 program so that if the alternate AUTOEXEC.BAT file is altered to contain the LOTUS 1-2-3 program, the system will come up with a request for appropriate user input in that application as shown at step 41. After completion at step 42 of the use of the LOTUS 1-2-3 program or whatever application may have been loaded, a branch is then made to display the IBM DOS ROM Shell screen as shown at step 23, assuming that no applications have been selected for initialization at step 43. Step 43 will be discussed below.

Figure 4:
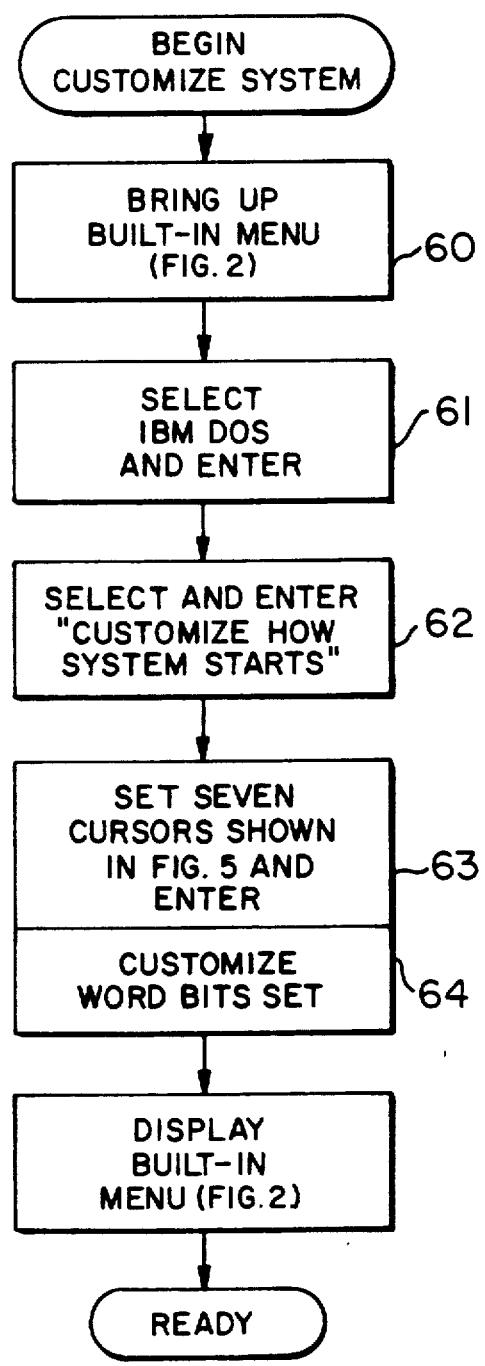
FIG. 4 is a flowchart providing further details of the manner in which initialization is customized.

While the flexible nature of the initialization routine has been described, the manner in which the user is enabled to have such flexibility will now be discussed. As previously stated, the system upon default initialization provides the ROM Shell screen shown in FIG. 2. When the user wishes to customize initialization, a start is made with the ROM Shell screen at step 60 as shown in FIG. 4. On that screen, the user selects the IBM DOS category as shown at step 61. As previously described, that will result in a screen showing various functions available to the user in IBM DOS. One of those functions is titled "Customize How The System Starts". The user will then select that function at step 62 which thereupon brings up the screen shown in FIG. 5. The user then selects the particular initialization routine he wishes to exercise as shown at step 63, save the changes as shown at step 64 and thereafter will experience initialization in the customized fashion just selected.

Figure 5:
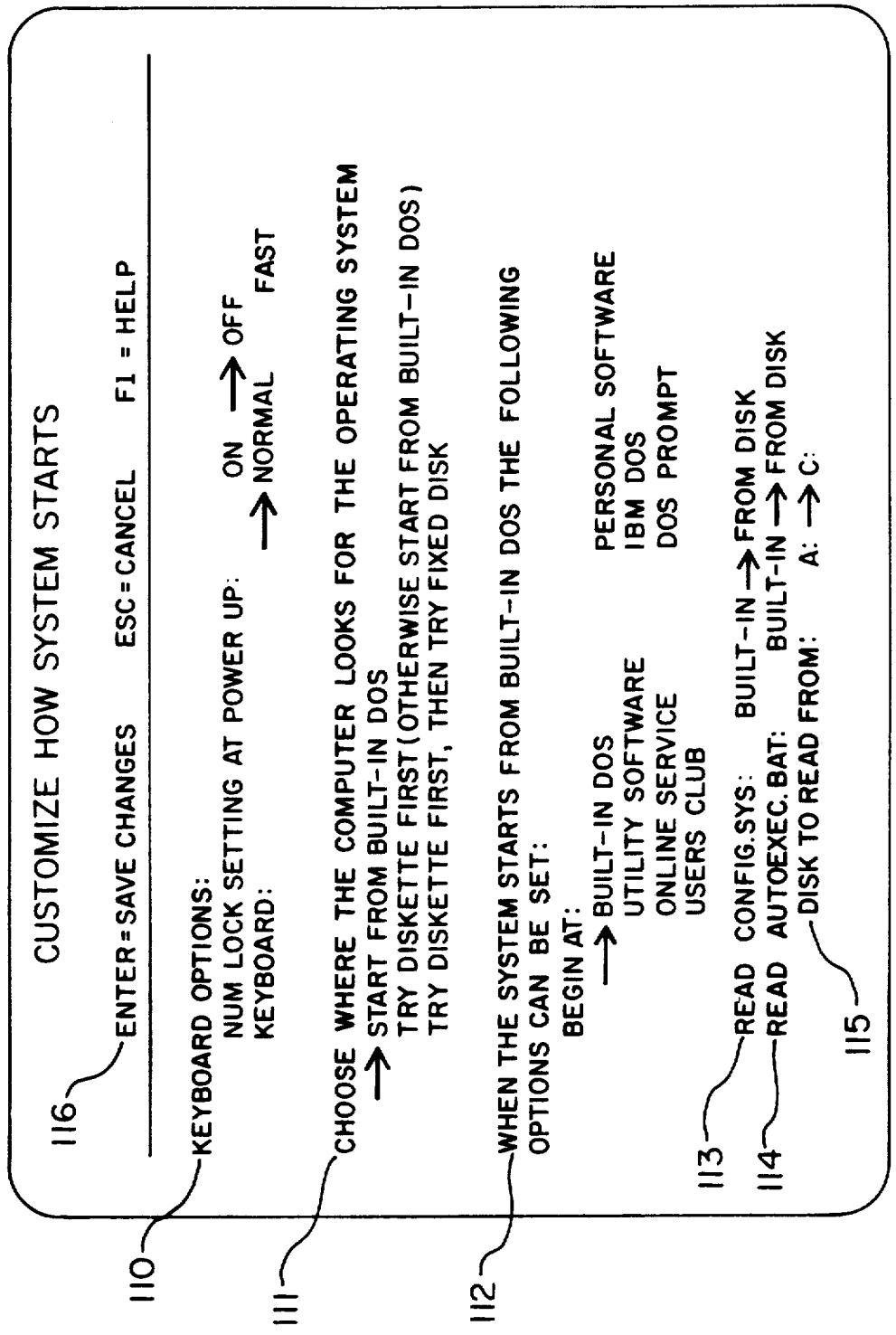
FIG. 5 shows the display screen used for selecting options in directing changes for machine initialization.

FIG. 5 shows the various customizing options available. For example, for the keyboard options 110 the user can bring up the computer with the keyboard number lock setting off or on, and can select either a normal or fast keyboard speed. More pertinent to the discussion of this invention, FIG. 5 shows that the user can "choose where the computer looks for the operating system" 111, in order to change the start from "Built in DOS" which is the default operating system. The initialization routine can be instructed to try the diskette first and then go to "Built in DOS", or the computer can be instructed to try the diskette first and then try the fixed disk. By moving the cursor with either the mouse or the keyboard, these other options can be selected. It is in that manner that the user can select an alternate operating system.

If the user desires to start the system in "Built in DOS" but desires to skip the need for selecting from the ROM shell screen shown in FIG. 2, a selection can be made at 112 of Utility Software or of On-line Services or of Users Club or of an IBM DOS Shell showing the various functions in IBM DOS, or of the DOS Prompt or of the category Personal Software which displays the user's own directory of programs.

If the user desires to utilize an alternate CONFIG.SYS or AUTOEXEC.BAT file, the selection can be indicated near the bottom of the screen shown in FIG. 5 at 113 and 114 together with the appropriate drive from which to read a 115.

The use of the customization screen shown in FIG. 5 with the placing of the seven cursors in desired locations creates a customized start by saving the changes upon pressing of the enter key as shown at 116. The options are saved by setting flags (bits) in a special "customization word" located in RAM and then transferring the word to the battery backed up CMOS 18. In that manner, the word is retained when the computer is powered down during the period of non-use. The next time that the user approaches the machine and turns it on, the initialization routine inspects that customization word in order to ascertain how the bits have been set and in that manner knows which branch to take at step 25, at step 26, and at steps 29, 32 and 35, as well as at step 43. If, for example, Utility Software was chosen on the screen shown in FIG. 5 as the selected option in which to bring up the machine, when the initialization routine shown in FIG. 3 reaches step 43, a "selected application" notation would be observed and a branch would be made to bring the machine up as shown at step 44. The specified action at step 44 would be to bring the machine up in Utility Software.'Again, should the user wish to return to the ROM Shell screen at step 23 to utilize some application other than Utility Software, a return can be made to the ROM Shell screen at step 45 as shown in FIG. 3.

Use of the screen shown in FIG. 5 results in a setting of the customization word. That word is shown below.

| | | | | | Customize Word Bit Definitions | | | | | | | | | | | |
|---|---|---|---|---|---|---|---|---|---|---|---|---|---|---|---|---|
| Bit | F | E | D | C | B | A | 9 | 8 | 7 | 6 | 5 | 4 | 3 | 2 | 1 | 0 |
| Value | CC | SD | SD | SD | SD | SD | BT | BT | NL | AS | AS | AS | R | SR | C | A |
| | CC | | | | First Time Flag for COMMAND.COM for displaying ROMSHELL or NOT | | | | | | | | | | | |
| | | | | | 1 = COMMAND.COM has not been invoked. | | | | | | | | | | | |
| | | | | | (BIOS sets) | | | | | | | | | | | |
| | | | | | 0 = COMMAND.COM has been invoked | | | | | | | | | | | |

-continued

| | | | | | Customize Word Bit Definitions | | | | | | | | | | |
|---|---|---|---|---|---|---|---|---|---|---|---|---|---|---|---|
| Bit | F | E | D | C | B | A | 9 | 8 | 7 | 6 | 5 | 4 | 3 | 2 | 1 | 0 |
| Value | CC | SD | SD | SD | SD | SD | BT | BT | NL | AS | AS | AS | R | SR | C | A |

```
              (COMMAND.COM resets)
       SD    Systems Drive
             000 = A: drive
             010 = C: drive
       BT    Booting Options
             00 = Boot from ROM
             01 = Try diskette from boot from ROM
             10 = Try diskette, then Hard Disk, then boot
                  from ROM
             11 = Invalid
       NL    Num Lock on/off
             0 = Num Lock on
             1 = Num Lock off
       AS    Application Select
             000-ROM Shell Menu
             001-Utility Software
             010-On-line Service
             011 = User's Club
             100 = Personal Software
             101 = IBM DOS (DOS Shell)
             111 = DOS Prompt
       SR    Alt-Sysreq boot
             1 = Alt-Sysreq boot
             0 = Normal boot
       C     Read Config.sys
             0 = Read Config.sys from ROM
             1 = Read Config.sys from Sys drive
       A     Read Autoexec.bat
             0 = Read Autoexec.bat from ROM
             1 = Read Autoexec.bat from Sys drive
```

Thus, for example, if the user desires to repeatedly bring up an alternate operating system, the BT bits will be set to 01 in order to instruct the initialization routine to go to the diskette drive rather than to use the IBM DOS located in ROM. Should the alternate system be on the fixed disk drive, the BT bits will be set to 10.

The use of the screen shown in FIG. 5 can result in the selection of an alternate application in which to bring up the system in which case the "AS" bits will be set to bring the system up in Utility Software 001, On-line Service 010, Users Club 011, Personal Software 100, the IBM DOS Shell 101, or the DOS prompt 111. If "Personal Software" is selected, then the machine can be brought up showing a list of programs which the user has established in his own directory.

Should the sophisticated user wish to change the default CONFIG.SYS or default AUTOEXEC.BAT selection to a personalized file, the screen shown in FIG. 5 enables the user to set the C bit and the A bit accordingly, and also, to set the SD bits to read either the diskette drive (the A drive) or from the disk drive (the C drive).

As described above, the user is provided with a powerful initialization routine to allow him great flexibility in causing the machine to boot from other drives, to automatically start applications and to read DOS start up files from either the hard disk or diskette drive. However, problems can occur with allowing the user this much freedom. For example, the user could effectively lock himself out of the use of his computing system. This might be done by placing an incorrect instruction in the CONFIG.SYS file such as calling for an incorrect device name. In such case, when the system is started and this line is read, the system will lock up. If the file is being read from the hard disk, there will be no way for the user to recover and he will not be able to use the computing system without a service call.

The flexible initialization system provides a technique to give the user a way of always being able to reset the computing system to the default configuration. In that manner, if he has written a bad DOS start up file or has deleted the partition on his hard disk and doesn't have a bootable diskette, he can recover and still be able to use the computing system. The technique calls for the initializing routine to check manually operated indicia for a user initiated condition during the power up sequence. This condition can be the holding down of the mouse button or holding a specified key or set of keys when the power on switch is thrown. During power up, the initializing routine immediately checks for the state of the manually operated indicia as shown at step 46 in FIG. 3. If it is in the designated state, at step 47 the initializing routine then resets the bits in the customizing word in RAM which defines the system start up options. By resetting the options to their default state, the machine is thereby returned to a known state. That is, it will boot from DOS in ROM at step 22 and begin at the ROM shell menu. The various special DOS start up files will not be read but instead, files located in ROM will be read at steps 22A and 22B. In that manner, the user can utilize the computer, the user can correct the problem that caused the lock out, and can again attempt to customize system start up in the manner described above.

This invention alters the flexible initialization system to enable a computer user who has finished a session on the DOS located in ROM to bring up the machine in an alternate operating system without the need to change the customized initialization from the preferred start-up sequence. Instead, the user need only place the alternate system on one of the system drives, (it could be on the fixed disk, for example) and then operate some indicia such as pressing the "alternate" key together with the "system request" key. The invention enables the user to retain the capability of thereafter starting the machine in the usual operating system of choice. This invention enables the user to go to games, which sometimes include their own rudimentary operating system, without turning the computer off.

The system has customizing bits which enable the user to temporarily change the start-up sequence by setting the "alternate system request" customizing bit (SR bit) through manually operated indicia such as the pressing of an appropriate combination of keys after bringing up the ROM shell screen shown in FIG. 2. When the combination of keys action is sensed, the SR bit is set and the computer is automatically reinitialized in the operating system or game found in the diskette drive, or on a fixed disk. During the reinitialization, the SR bit is reset so that future initializations will be in the expected operating system and not in the "alternate system request" mode. Since initializations clear memory, the writable permanent memory is used (CMOS) and the customization word set forth above includes the SR bits. The initializing routines to reset the SR bit are located in permanent read-only memory (ROM) as is the routine for recognizing the alternate system request key combination to set the SR bit.

Figure 6:
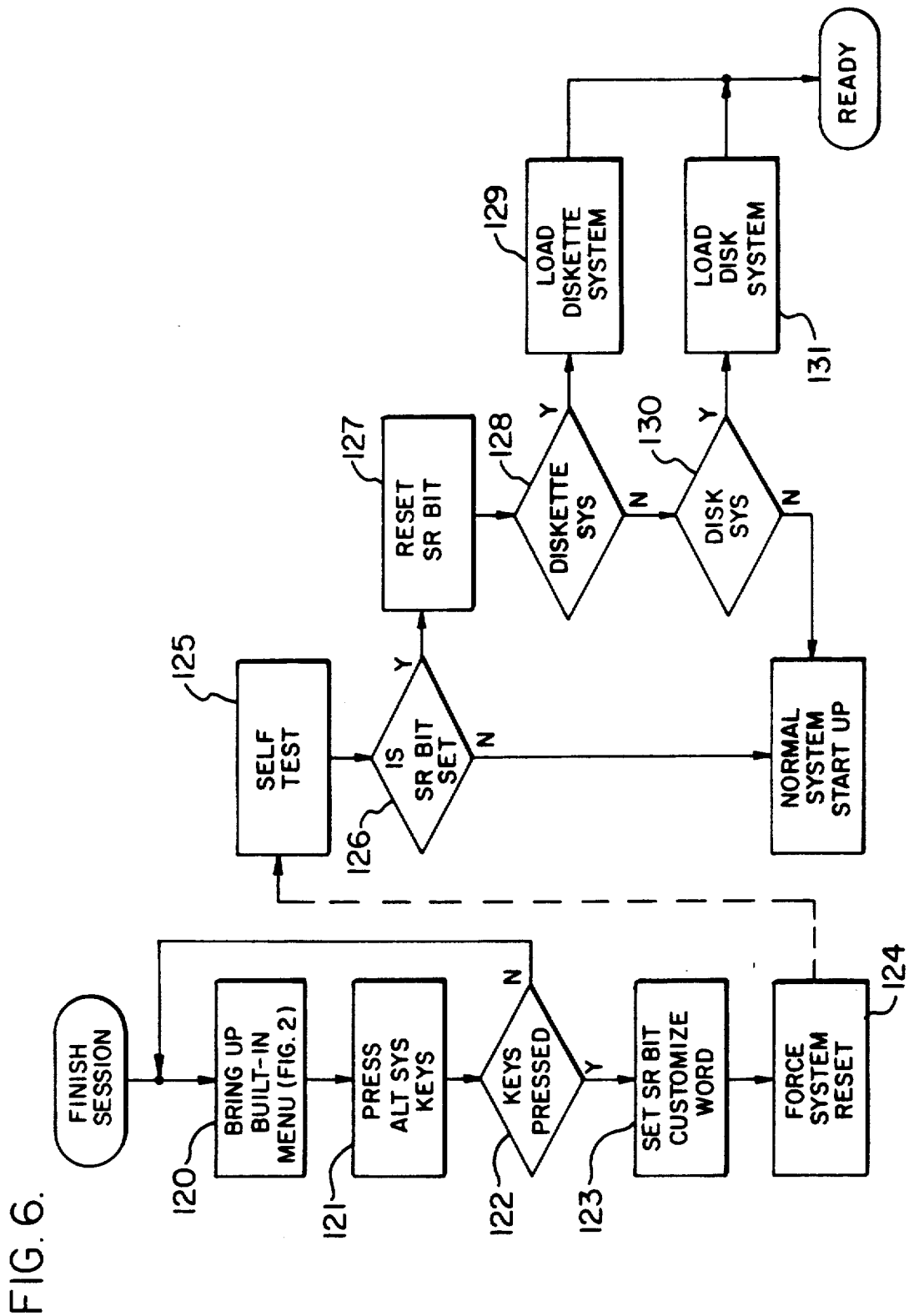
FIG. 6 is a flowchart showing the alterations of the flexible initialization system to implement the instant invention.

FIG. 6 shows that when a session is finished, the built-in menu (ROM shell screen) is brought up at step 120. Next, at 121, the computer user presses the alternate and the system request keys and the system menu routine located in ROM senses that action at step 122. The SR bit located in CMOS 18 is set at step 123 and the system menu routine then forces a system reset at step 124 as though the machine had been turned off and then restarted. A self-test is begun at step 125, after which the SR bit is tested at step 126 and reset at step 127. The diskette drive 14 is then checked at step 128 to determine whether the user has placed the desired alternate system or game on that drive. If so, the alternate system is loaded at step 129 and the machine is ready. If not, the fixed disk drive 15 is addressed at step 130 and the alternate system is loaded at step 131. If no alternate system is present on a system drive, a return is made for a normal system initialization such as begins at step 25 of FIG. 3.

Thus, a user can use the alternate system request feature to go to games or other systems without disturbing the contents of the customization word, except for the SR bit. In that manner, customized initialization is retained for the next start-up sequence.

While the system has been described with reference to a preferred embodiment, it will be understood by those skilled in the art that many changes in form and detail may be made without departing from the spirit and scope of the invention.

What is claimed is:

1. A computer system with the capability of automatically initializing itself in an operating system of choice, comprising:
   a data processor;
   random access memory (RAM), read only memory (ROM) and permanent read/write memory, all connected to said data processor;
   system drive means connected to said processor for holding alternate operating systems;
   input means and output means both connected to said processor;
   customization word means located in said permanent read/write memory for directing the initialization of said computer system in the operating system of choice when power is turned on;
   indicia means located within said input means for enabling the user to request an alternate system through operation of said indicia means;
   routines located in ROM to check for the operation of indicia means, and if operated, to set an alternate system request (SR) bit in said customization word means and force a system reset; and
   initialization routines located in ROM and operable upon system reset for checking said SR bit resetting said SR bit, and loading said alternate system from said system drive means;
   whereby said computer system is restarted in an alternate operating system without turning said computer off and then on and without changing the manner of initialization on future start-ups.

2. The system of claim 1 wherein said permanent read/write memory is battery backed-up for retaining data during periods when computer power is off.

3. The system of claim 1 wherein said ROM contains a default operating system which is automatically loaded into RAM unless said customization word means directs otherwise.

4. The system of claim 3 wherein said ROM contains a shell means which is automatically loaded into RAM with said default operating system for creating on said output means a display of choices for operator interaction.

5. The system of claim 4 wherein said display of choices include information, utility software, personal software and operating system.

6. The system of claim 5 wherein said customization word means contains bits for directing the initialization of said system in one of the choices on said display of choices.

7. The system of claim 3 wherein said ROM contains default operating system files which are automatically loaded into RAM with said default operating system unless said customization word means directs otherwise.

8. The system of claim 7 wherein said customization word means contains for directing the initialization of said system in an application of choice.

9. The system of claim 2 wherein said customization word means contains bits for directing the initialization of said system in an application of choice.

* * * * *